United States Patent [19]

Izod

[11] 4,331,694

[45] May 25, 1982

[54] REMOVAL OF CAFFEINE BY SELECTIVE ADSORPTION USING ZEOLITE ADSORBENTS

[75] Inventor: Thomas P. J. Izod, Holliston, Mass.

[73] Assignee: Union Carbide Corporation, Danbury, Conn.

[21] Appl. No.: 177,629

[22] Filed: Aug. 13, 1980

Related U.S. Application Data

[63] Continuation of Ser. No. 973,438, Dec. 26, 1978, abandoned.

[51] Int. Cl.$^3$ .......................... A23F 5/22; A23F 3/38
[52] U.S. Cl. .................................. 426/422; 423/328; 544/274
[58] Field of Search ................ 544/274, 275; 426/422

[56] References Cited

U.S. PATENT DOCUMENTS

| | | | |
|---|---|---|---|
| 2,309,092 | 1/1943 | Berry et al. | 426/424 |
| 2,375,550 | 5/1945 | Grossman | 426/427 X |
| 2,391,981 | 1/1946 | Kremers | 426/428 X |
| 4,031,251 | 6/1977 | Margolis et al. | 426/422 X |
| 4,113,887 | 9/1978 | Kramer et al. | 426/422 |
| 4,113,888 | 9/1978 | Henig et al. | 426/422 |

OTHER PUBLICATIONS

Breck, Zeolite Molecular Sieves, 1974, John Wiley & Sons, New York, pp. 2, 3, 176, 177.
Hawley, The Condensed Chemical Dictionary, 9th Ed. 1977, Van Nostrand Reinhold, New York, p. 147.

*Primary Examiner*—Joseph M. Golian
*Attorney, Agent, or Firm*—James L. Sonntag

[57] ABSTRACT

Caffeine is selectively adsorbed from aqueous solutions such as coffee and tea by contact with a particular form of zeolites created by high temperature rigorous steaming of a low sodium form of zeolite Y.

8 Claims, No Drawings

REMOVAL OF CAFFEINE BY SELECTIVE ADSORPTION USING ZEOLITE ADSORBENTS

This application is a continuation of our prior U.S. application Ser. No. 973,438, filed Dec. 26, 1978, now abandoned.

The present invention relates in general to the removal of caffeine from aqueous solutions, and more particularly to the removal of caffeine from aqueous solutions containing same such as coffee or tea by selective adsorption using a particular modified form of zeolite Y as the adsorbent.

The alkaloid caffeine occurs naturally in a variety of plants, most notably those which are the source of coffee and tea. Because of its bitter taste, caffeine is generally not considered to be a desirable flavoring ingredient in either coffee or tea; but due to its physiological activity as a stimulant for the central nervous system and as a diuretic, its normal presence in substantial concentrations in these two ubiquitous beverages renders it both a boon and a bane, depending upon the particular condition of the individual consumer at the time of consumption. Thus a considerable amount of time, effort and money have been, and continue to be, expended in the attempt to remove caffeine from beverages, coffee, particularly, without unduly affecting their other properties, and moreover, to recover the removed caffeine economically and in a relatively pure form so that it can be used medicinally or incorporated in other beverages which otherwise would contain none or an insufficient amount such as cola flavored soft drinks.

In the decaffeination of coffee two general types of processes have been proposed, namely post-brewing separation of the caffeine, and pre-brewing extraction of the caffeine from the green coffee beans. The latter procedure is currently the most widely used commercially.

The principal steps in the decaffeination of green coffee beans are (a) increasing the moisture content of the beans from the normal 10 weight percent to above 18 percent, (b) contacting the hydrated beans with an organic solvent such as trichloroethylene to extract the desired amount of caffeine, (c) extensively steaming the extracted beans to remove all of the residual solvent, and (d) removing excess moisture to facilitate subsequent roasting. Recovery of the extracted caffeine is accomplished by distilling off the organic solvent, and it is for this reason that the highly solubilizing, though potentially hazardous halogenated hydrocarbons extractants are resorted to reduce the energy requirements of the distillation procedure. Prior to the present invention the use of water alone as the extractant medium has not been feasible because of the increased difficulties in isolating the extracted caffeine from the substantial amounts of water required.

The use of halogenated hydrocarbons has, however, been avoided in prior proposed decaffeination processes by resort to the second of the two general types of procedures, i.e., post-brewing separation of the caffeine from the beverage product. For this purpose a variety of adsorbent materials have been proposed, including ion exchange resins, activated carbons, and a number of silicate minerals such as clays, hydrated magnesium trisilicate and hydrated aluminum silicate, to preferentially adsorb the caffeine from the brewed product in the aqueous form. These procedures involve some serious drawbacks, however, mainly attributable either to relatively poor selectivity and/or capacity of the adsorbent for the caffeine. Activated carbons, for example, have been found to adsorb a considerable portion of the flavor components of the beverage being treated along with the caffeine. The proposed clay minerals also have the disadvantage of a low adsorptive capacity for caffeine under the imposed conditions. Ion exchange resins, such as polystyrene sulfonic acid resins, on the other hand, exhibit a very high degree of selectivity for caffeine, but tend to reduce the pH value of the extract to a point that an irreversible off-taste and a difficult, redissolvable precipitate is produced.

Considering the well-known properties of molecular sieve zeolites as a general class of adsorbents, it is not surprising that they have not heretofore been found suitable selective absorbents for caffeine. More particularly, few of the known molecular sieve zeolites have pores large enough to admit molecules the size of caffeine, and those that do, such as zeolite X and zeolite Y, for instance, have a greater selectivity towards the molecules in the beverage extracts which are more polar than caffeine.

It has now been found, however, that a particular form of zeolite Y, denominated UHP-Y, exhibits a unique selectivity and capacity for caffeine in aqueous solutions and is highly effective in separating same either from aqueous green bean extract or from the caffeine-containing beverage composition.

UHP-Y zeolites are defined and the method for their preparation disclosed in detail in copending and commonly assigned U.S. Application Ser. No. 880,561, filed Feb. 23, 1978, by David E. Earls and entitled "Ultrahydrophobic Zeolite Y", said application being incorporated by reference herein in its entirety. In general, UHP-Y zeolites can be characterized to distinguish them from all other zeolite forms as being zeolitic aluminosilicates having a $SiO_2/Al_2O_3$ molar ratio of from 4.5 to 35, preferably 4.5 to 9, the essential X-ray powder diffraction pattern of zeolite Y, an ion-exchange capacity of not greater than 0.070, a unit cell dimension $a_o$, of from 24.20 to 24.45 Angstroms, a surface area of at least 350 $m^2/g$. (B-E-T), a sorptive capacity for water vapor at 25° C. and a $p/p_o$ value of 0.10 of less than 5.00 weight percent, and a Residual Butanol Test value of not more than 0.40 weight percent.

As used herein in this Specification and the appended claims, the following terms are intended to have the meanings set forth immediately below:

Surface areas of all zeolitic compositions are determined by the well-known Brunauer-Emmett-Teller method (B-E-T) (S. Brunauer, P. Emmett and E. Teller, J. Am. Chem. Soc. 60, 309 (1938)) using nitrogen as the adsorbate.

The essential X-ray powder diffraction pattern of zeolite Y is set forth in U.S. Pat. No. 3,130,007, issued Apr. 21, 1964 and is incorporated by reference herein in its entirety. It will be understood by those skilled in the art that the shrinkage of the unit cell resulting from the present stabilization process will cause some slight shift in the d-spacings. In all events, the X-ray diffraction pattern of the UHP-Y compositions will exhibit at least the d-spacings corresponding to the Miller Indices set forth in Table A on the following page, and can contain all the other d-spacings permissible to the face-centered cubic system with a unit cell edge of 24.20 to 24.45 Angstroms. The value of the d-spacings in Angstroms can be readily calculated by substitution in the formula:

$$d_{hkl} = \frac{a_0}{\sqrt{h^2 + k^2 + l^2}}$$

The X-ray pattern of the UHP-Y zeolites is obtained by standard X-ray powder techniques. The radiation source is a high intensity, copper target, X-ray tube operated at 50 Kv and 40 ma. The diffraction pattern from the copper K radiation and graphite monochromator is suitably recorded by an X-ray spectrometer scintillation counter, pulse height analyzer and strip chart recorder. Flat compressed powder samples are scanned at 1° per minute, using a 2 second time constant. Interplanar spacings (d) are obtained from Bragg Angle (2 theta) positions of peaks after subtracting background. The crystal symmetry is cubic.

TABLE A

| Miller Indices hkl | Intensity $I/I_o$ |
|---|---|
| 111 | very strong |
| 220 | medium |
| 311 | medium |
| 331 | strong |
| 333; 511 | medium |
| 440 | medium |
| 533 | strong |
| 642 | strong |
| 751; 555 | strong |

The anhydrous state of any zeolite composition for purposes of determining constituent proportions in terms of weight percent is the condition of the zeolite after being fired in air at 1000° C. for one hour.

The term ion exchange capacity or IEC is intended to denote the number of active cation sites in the zeolite which exhibit a strong affinity for water molecules and hence appreciably affect the overall capacity of the zeolite to adsorb water vapor. These include all sites which are either occupied by metal or non-metal cations, or which are not occupied by any cation, but in any event are capable of becoming associated with sodium cations when the zeolite is contacted at 25° C. three times for a period of one hour each with a fresh aqueous ion exchange solution containing as the solute 0.2 mole of NaCl per liter of solution, in proportions such that 100 ml. of solution is used for each gram of zeolite. After this contact of the zeolite with the ion-exchange solution, routine chemical gravimetric analysis is performed to determine the relative molar proportions of $Al_2O_3$, $SiO_2$ and $Na_2O$. The data are then substituted in the formula:

IEC=k[Na$_2$O/SiO$_2$]

wherein "k" is the $SiO_2/Al_2O_3$ molar ratio of the zeolite immediately prior to contact with the NaCl ion-exchange solution.

The Residual Butanol Test is a measure of the adsorptive selectivity of zeolite adsorbents for relatively non-polar organic molecules under conditions in which there is active competition between water and less polar molecules for adsorption on the zeolite. The test procedure consists in activating the zeolite sample by heating in air at a temperature of 300° C. for 16 hours. Thereafter, the activated zeolite crystals are slurried with a solution of 1-butanol in water in proportions such that the slurry consists of 1.0 part by weight 1-butanol, 100 parts by weight water and 10 parts by weight of the as-activated zeolite. The slurry is mildly agitated for 16 hours while the temperature is maintained at 25° C. The supernatant liquid is then analyzed for its residual 1-butanol content in terms of weight percent.

For the determination of the sorptive capacity of the UHP-Y compositions for any particular adsorbate, for example, water, the test zeolite sample is activated by preheating at 425° C. for 16 hours at a pressure of 5 micrometers of mercury in a conventional McBain apparatus. Thereafter, the temperature of the sample is adjusted to the desired value and contacted with the vapor of the test adsorbate at the desired pressure.

In general, UHP-Y zeolites can be prepared from a type-Y zeolite starting material having a $SiO_2/Al_2O_3$ molar ratio of from 4.5 to 6.0, not greater than 3.3 equivalent percent metal cations and having an adsorptive capacity for water vapor at 25° C. and a $p/p_o$ value of 0.10 of at least 6.0 weight percent and a surface area of at least 350 m$^2$/g. The conversion to a UHP-Y type zeolite is accomplished by calcining the starting zeolite in an environment comprising from about 0.2 to 10 atmospheres of steam at a temperature of from 725° C. to 870° C. for a period of time sufficient to reduce the adsorption capacity for water vapor at 25° C. and a $p/p_o$ value of 0.10 of less than 5.00 weight percent. It is advantageous to carry out the calcination in an environment of steam at about 1 atmosphere pressure and at a temperature of about 800° C. for a period of from about 0.5 to 4 hours.

The decaffeination process of the present invention comprises contacting in the liquid phase an aqueous solution containing caffeine as a solute in a concentration of at least 0.01 weight percent based on the combined weight of water and caffeine with a UHP-Y zeolite at a temperature of not more than 100° C., whereby caffeine is adsorbed by the zeolite and isolating the zeolite containing the adsorbed caffeine. Regeneration of the caffeine-loaded zeolite is accomplished by contact with a polar solvent for the caffeine under nonequilibrium conditions, i.e. with the temperature sufficiently high and/or the caffeine content of the polar solvent sufficiently low that desorption of caffeine with consequent solution in the solvent occurs.

The method of contact of the UHP-Y zeolite with the aqueous caffeine solution is not a critical factor. Preferably, the zeolite adsorbent is contained in a fixed adsorption bed and the solution to be treated passed through the bed until breakthrough of caffeine occurs or is imminent. Regeneration of the adsorbent bed and recovery of the caffeine is advantageously accomplished by passing a desorbent solvent, preferably ethanol, countercurrently through the bed at an elevated temperature, preferably from about 20° C. to 80° C. It is also feasible to form a slurry of UHP-Y zeolite particles with the caffeine solution and then isolate the resulting caffeine-loaded zeolite from the treated solution by filtration, centrifugation and the like. Where relatively small quantities of caffeine solution such as one cup or a pot of coffee or tea are involved, the zeolite adsorbent can be introduced into the solution as retrievable tablets, pellets or permeable containers of zeolitic particles such as are commonly used for tea bags.

The invention is illustrated by the following examples:

EXAMPLE 1

(Preparation of UHP-Y Adsorbent)

A sample of air-dried ammonium exchanged type Y zeolite having a composition exclusive of water of hydration: 0.156 Na$_2$O:0.849 (NH$_4$)$_2$O:Al$_2$O$_3$:5.13 SiO$_2$ was tableted into ½ inch diameter slugs and charged to a Vycor tube 24 inches in length and 2.5 inches in diameter and provided with an external heating means. Over a period of 0.25 hours, the temperature of the charge was raised to 600° C. and thereafter maintained at this temperature for one hour. During this 1.25 hour period, a pure steam atmosphere at 14.7 psia generated from demineralized water was passed upward through the charge in the tube at a rate of 0.1 to 0.5 pounds per hour. Ammonia gas generated during the heating by deamination of the zeolite was passed from the system continually. At the termination of the heating period the steam flow through the tube was stopped and the temperature of the charge in the tube was lowered to ambient room temperature over a period of 5 minutes. Analysis of this composition indicated the characteristic X-ray powder diffraction pattern of zeolite Y, a surface area of 760 m$^2$/g. and an a$_o$ value of 24.52 Angstroms. Thereafter the sodium cation content of the first steamed material was reduced to 2.0 equivalent percent (0.27 weight percent as Na$_2$O) by ion exchange using an aqueous solution of NH$_4$Cl (30 wt.-%) at reflux. This product was thereafter converted to UHP-Y using the same apparatus and conditions except that the pure steam calcination atmosphere was passed over the sample in the reactor at 14.7 psia at a temperature of 800° C. for 4 hours. The product was cooled to ambient room temperature in a desiccator and portions thereof analyzed for ion-exchange capacity, B-E-T nitrogen surface area, adsorption capacity for water, nitrogen and n-hexane and Residual Butanol Test value. The data from the analyses are set forth below:

| Adsorbate | Adsorptive Capacity: | | |
|---|---|---|---|
| | Pressure mm Hg. | Temp., °C. | Loading, wt.-% |
| Nitrogen | 35 | −196 | 15.8 |
| Nitrogen | 66 | −196 | 16.5 |
| Nitrogen | 137 | −196 | 17.3 |
| Nitrogen | 528 | −196 | 19.2 |
| Water | 2.0 | 25 | 3.1 |
| Water | 4.6 | 25 | 4.6 |
| Water | 20.0 | 25 | 15.0 |
| n-Hexane | 5.0 | 25 | 10.8 |
| n-Hexane | 20.0 | 25 | 14.2 |
| n-Hexane | 50.0 | 25 | 16.0 |
| n-Hexane | 75.0 | 25 | 19.8 |

Ion-Exchange Capacity: = 0.04
Surface Area = 530 m$^2$/g.
Residual Butanol Test
Value = 0.23 weight percent

EXAMPLE 2

As a demonstration of the efficacy of UHP-Y zeolites in adsorbing caffeine from aqueous solutions, 0.5 grams of each of three different UHP-Y samples having SiO$_2$/Al$_2$O$_3$ molar ratios of 75.5, 26.7 and 7.4 respectively were separately slurried in 5 ml. of solutions of caffeine dissolved in water having caffeine concentrations of 0.1, 0.5 and 1.0 weight percent (based on the overall weight of the solution). In each case the slurry was agitated for two and one-half hours at a temperature of about 22° C. Thereafter, the solutions were isolated and analyzed for residual caffeine concentration. For purposes of comparison, a sample of zeolite Y essentially the same as the steamed starting material used to prepare UHP-Y in Example 1 (supra) and having a SiO$_2$/Al$_2$O$_3$ molar ratio of about 5.0 was tested in the same manner. Also tested under the same conditions was a sample of a high silica zeolite (SiO$_2$/Al$_2$O$_3$=50) topologically related to zeolite ZSM-8 (U.S. Pat. No. 3,700,585, issued October 24, 1972). The pore diameters of the ZSM-8 type zeolite is approximately 6 Angstroms. The results are set forth in Table I on the following page:

TABLE I

| Run No. | Adsorbent | Initial Caffeine Conc., wt-% | Final Caffeine Conc., wt-% | Zeolite -Caffeine Loading, wt-% |
|---|---|---|---|---|
| 1 | UHP-Y (Si/Al = 38) | 1.0 | 0.018 | 9.8 |
| 2 | " | 0.5 | 0.009 | 4.9 |
| 3 | UHP-Y (Si/Al = 13.4) | 1.0 | 0.014 | 9.9 |
| 4 | " | 0.5 | 0.013 | 4.9 |
| 5 | " | 0.1 | 0.012 | 0.9 |
| 6 | UHP-Y (Si/Al = 3.7) | 1.0 | 0.012 | 9.9 |
| 7 | ZSM-8 type(Si/Al = 25) | 1.0 | 1.00 | 0 |
| 8 | " | 0.5 | 0.495 | 0.005 |
| 9 | " | 0.1 | 0.100 | 0 |
| 10 | Zeolite Y (steamed) Si/Al = 2.5 | 1.0 | 0.383 | 6.2 |
| 11 | Zeolite Y (steamed) Si/Al = 2.5 | 0.5 | 0.123 | 3.7 |
| 12 | Zeolite Y (steamed) Si/Al = 2.5 | 0.1 | 0.012 | 0.9 |

The data shows a surprisingly selectivity and capacity of UHP-Y zeolites for caffeine in aqueous solution. It is also apparent that the SiO$_2$/Al$_2$O$_3$ molar ratio of the UHP-Y zeolites is not a critical factor over the range employed. The UHP-Y precursor composition (Runs 10–12) are clearly demonstrated to be greatly inferior when caffeine concentrations above 0.1 weight percent are present in the pre-treatment solutions.

EXAMPLE 3

Adsorption experiments using actual coffee beverage solutions were carried out to demonstrate the capability of UHP-Y adsorbents to remove caffeine without unduly affecting the overall composition of the decaffeinated product. A standard coffee solution was prepared by dissolving 3 grams of an "instant" freeze-dried powdered coffee concentrate in 250 ml. of boiling water. The caffeine concentration of this coffee solution was 445 mg./liter. The coffee solution was cooled to ambient room temperature and portions thereof slurried with various proportions of UHP-Y zeolites for a 2 hour period. Thereafter the coffee solution was analyzed for caffeine content. For purposes of comparison, beads of activated carbon were tested in the same manner. The results are shown in Table II below.

TABLE II

| Run No. | Adsorbent | Weight of Adsorbent grams | Volume of Coffee Solution ml. | Residual Caffeine in Coffee Solution μg/ml. | Caffeine Reduction, % |
|---|---|---|---|---|---|
| 1 | UHP-Y (Si/Al = 38) | 0.5042 | 10 | 31 | 93 |

TABLE II-continued

| Run No. | Adsorbent | Weight of Adsorbent grams | Volume of Coffee Solution ml. | Residual Caffeine in Coffee Solution μg/ml. | Caffeine Reduction, % |
|---|---|---|---|---|---|
| 2 | " | 0.4860 | 5 | 30 | 93 |
| 3 | " | 0.3363 | 10 | 30 | 93 |
| 4 | UHP-Y (Si/Al = 13.4) | 0.3377 | 10 | 42 | 91 |
| 5 | " | 0.1329 | 10 | 42 | 91 |
| 6 | Activated Carbon | 0.4923 | 14 | 30 | 93 |

It is apparent from the test data that the activated carbon was comparably effective in adsorbing the caffeine from the coffee solution. Organoleptic evaluation, however, established that in the case of the UHP-Y adsorption, the natural aroma of the coffee remained after treatment whereas in the case of the activated carbon the treated coffee solution was devoid of all aroma. The UHP-Y treated samples also, in marked contrast with the activated carbon treated samples, retained the essential coffee flavor without unacceptable off-tastes.

EXAMPLE 4

It was established experimentally that ethanol or a mixture of ethanol and water is highly effective in desorbing caffeine from the UHP-Y adsorbents, thereby providing an alternate to the use of halogenated hydrocarbons with the attendant difficulties in avoiding potential health hazards. In these experiments column studies were performed using a column packed with UHP-Y particles bonded with 15 weight percent alumina binder. The column was 0.75 cm. inside diameter and 20 cm. long, and contained 4.78 grams of the bonded adsorbent in the form of particles 35-40 mesh. In operation, an aqueous caffeine solution containing 1.25 weight percent caffeine was pumped through the column at the rate of 3.2 ml./min. at ambient room temperature. At breakthrough, the caffeine loading in the column was 9.3 weight percent based on the dry weight of the bonded adsorbent. The effectiveness of water at 55° C. and 100° C. in desorbing the caffeine was determined by passing water at these temperatures respectively (starting in each case with a breakthrough loading of caffeine on the zeolite) through the column at a rate of 3.2 ml./min. for a period of two hours. Thereafter, a fresh solution of 1.25 wt-% caffeine in water was again passed through the column at the rated 3.2 ml./min. until caffeine breakthrough. Calculations from this data indicated very little recovery of caffeine, i.e. of the order of 20 percent.

In marked contrast, ethanol alone or in admixture with water was found to be effective at room temperature in caffeine desorption; the degree of effectiveness depending largely upon the relative proportion of ethanol present. In the determination, 2.0 grams of UHP-Y which had been loaded by contact for 1 hr. with 20 ml. of a 1.25 wt.-% aqueous caffeine solution, were contacted for 30 minutes with 20 ml. of the test desorbent. Fifteen ml. of the recovered desorbent was evaporated to dryness and the amount of desorbed caffeine determined gravimetrically. The results are set forth below:

TABLE III

| Run No. | Recovery Solvent | % Caffeine Removed | |
|---|---|---|---|
| 1 | 5% Ethanol/95% Water | 6% | (by weight) |
| 2 | 10% Ethanol/90% Water | 15% | |
| 3 | 50% Ethanol/50% Water | 84% | |
| 4 | 100% Ethanol | 85% | |

EXAMPLE 5

To establish the efficacy of removing caffeine from green coffee bean extract, 200 grams of green coffee beans were added to 1 liter of water and stirred for 48 hours at 80° C. Analysis of a portion of the liquor yielded a 5.3 weight percent soluble solids level. To increase the soluble solids content, 300 grams of beans and 200 ml. of water were added to the mixture and digested at 80° C. for 72 hours. Finally, an additional 200 grams of beans and 100 ml. of water were added and digested for an additional 24 hours. The slurry was filtered, and the filtrate found to contain 13 weight percent soluble solids [coffee (BRIX] and 11.0 mg./ml. caffeine. A series of 10 ml. portions of this filtrate were slurried for 1 hour with samples of the same UHP-Y zeolite used in Run Nos. 1 and 2 of Table I (supra). For purposes of comparison, highly crystalline samples of a steam-stabilized zeolite Y having an ion exchange capacity of 0.15, a $SiO_2/Al_2O_3$ molar ratio of 5.1, an oxygen adsorption capacity (at - 183° C. and an oxygen pressure of 100 mm. Hg) of 28 weight percent, and a unit cell dimension, $a_o$, of 24.47, were also tested in the same manner. Analysis of the treated filtrate gave the following results:

TABLE IV

| Run No. | Adsorbent | Weight Adsorbent gms | Final Caffeine μg/ml | % Caffeine reduction | Caffeine Loading wt. % | % Coffee (BRIX) | % Coffee reduction |
|---|---|---|---|---|---|---|---|
| 1 | Zeolite Y (steamed) | 0.1003 | 10.3 | 6.4 | 7.0 | 12.6 | 3.1 |
| 2 | " | — | 9.6 | 12.7 | — | 12.4 | 4.6 |
| 3 | " | 1.0029 | 8.5 | 22.7 | 2.5 | 11.9 | 8.5 |
| 4 | " | 2.0008 | 6.9 | 37.3 | 2.1 | 11.0 | 15.4 |
| 5 | UHP-Y | 0.1048 | 10.6 | 3.6 | 3.8 | 12.9 | 0.8 |
| 6 | " | 0.5005 | 8.6 | 21.8 | 4.8 | 11.9 | 8.5 |
| 7 | " | 1.0032 | 5.8 | 47.3 | 5.2 | 11.0 | 15.4 |
| 8 | " | 2.0014 | 2.2 | 80.0 | 4.4 | 9.6 | 26.2 |

What is claimed is:

1. Process for removing caffeine from aqueous solutions which comprises contacting in the liquid phase at a temperature of not more than 100° C. an aqueous solution containing at least 0.01 weight percent caffeine dissolved therein with a crystalline zeolitic molecular sieve having a $SiO_2/Al_2O_3$ molar ratio of from 4.5 to 35, the essential X-ray powder diffraction pattern of zeolite Y, and ion-exchange capacity of not greater than 0.070, a unit cell dimension, $a_o$, of from 24.20 to 24.45 Angstroms, a surface area of at least 350 $m^2/g.$, a sorptive capacity for water at 25° C. and a $p/p_o$ value of 0.10 of less than 5.00 weight percent, and a Residual Butanol Test value of not more than 0.40 weight percent, whereby caffeine is adsorbed on said zeolite, and thereafter isolating the said zeolite from said aqueous solution.

2. Process according to claim 1 wherein the $SiO_2/Al_2O_3$ molar ratio of the zeolite is from 4.5 to 9.0.

3. Process according to claim 1 which includes the further step of desorbing at least a portion of the caffeine from the zeolite containing same by contacting the zeolite with ethanol at a temperature of at least 20° C.

4. Process according to claim 3 wherein the ethanol is in the form of an aqueous solution containing at least 5 weight percent ethanol.

5. Process according to claim 4 wherein the aqueous solution of ethanol contains at least 10 weight percent ethanol.

6. Process according to claim 1 wherein the aqueous solution of caffeine is the aqueous extract of green coffee beans.

7. Process according to claim 1 wherein the aqueous solution of caffeine is an extract of roasted coffee beans.

8. Process according to claim 1 wherein the caffeine content of the aqueous solution being treated to remove caffeine is above 0.1 weight percent.

* * * * *

UNITED STATES PATENT AND TRADEMARK OFFICE
CERTIFICATE OF CORRECTION

PATENT NO. : 4,331,694
DATED : May 25, 1982
INVENTOR(S) : Thomas P.J. Izod

It is certified that error appears in the above—identified patent and that said Letters Patent is hereby corrected as shown below:

In the specification, column 2, line 32, after "1978," insert --now abandoned and continued as U.S. Application Serial No. 269,393, filed May 29, 1981,--.

Signed and Sealed this

Twenty-fourth Day of August 1982

[SEAL]

Attest:

GERALD J. MOSSINGHOFF

Attesting Officer

Commissioner of Patents and Trademarks